Sept. 14, 1943.  E. E. REYNOLDS  2,329,218
DECIMAL POINT INDICATING MECHANISM
Filed Nov. 29, 1940  3 Sheets-Sheet 1

FIG. 1

INVENTOR.
EUGENE E. REYNOLDS
BY
ATTORNEY.

Patented Sept. 14, 1943

2,329,218

UNITED STATES PATENT OFFICE 2,329,218

DECIMAL POINT INDICATING MECHANISM

Eugene E. Reynolds, Santa Fe, N. Mex., assignor to Marchant Calculating Machine Company, a corporation of California Application November 29, 1940, Serial No. 367,729

20 Claims. (Cl. 235—63)

My invention relates to decimal indicating devices for calculating machines and the like, and has particular reference to improved and simplified devices for indicating the correct position of the decimal point in a multiplication product and for indicating the correct position of the decimal point in a division quotient.

My invention is disclosed as embodied in a commercially known Marchant calculating machine such as is substantially disclosed and claimed in the Avery Patents No. 2,211,736 dated August thirteenth, 1940, and No. 2,216,659 dated October first, 1940. Therefore, a complete calculating machine is not disclosed in the present aplication since reference may be had to the above patents for the details of the machine including multiplication and division control mechanisms.

Although the current commercially known Marchant calculating machine differs in some details from the disclosures of the above patents, the operations are fundamentally the same, and it is also to be understood that the invention may be applied to other types of calculating machines wherein certain factors of a calculation are set up, and answers are indicated, in denominationally arranged registers.

Commercially known calculating machines of the above class, utilizing accumulator and counter registers and denominationally arranged selection mechanism, usually employ independently settable decimal markers or tabs which are manually positioned with respect to the several registers or amount indicating means according to certain set rules, involving mental calculation, in order to point off the decimal positions in the factors and results.

Many calculating machine operators find occasion to apply these rules very infrequently and, therefore, are prone to forget them unless the rules are very simple and elemental. Such methods not only consume time, because frequent resetting of the decimal indicators is necessary, but also make possible serious errors on the part of the operator.

I am aware that it has been previously proposed to utilize various arrangements for connecting together the decimal indicators of calculating machines so that when the decimal indicators associated with factor indicators are properly positioned, the decimal indicator associated with the register upon which the answer appears automatically will be properly set without requiring mental calculation by the operator; such arrangements being disclosed in the Rechnitzer Patent No. 809,075 dated January second, 1906; the Bacon Patent No. 1,503,742 dated August fifth, 1924; and the Bley Patent No. 1,799,037 dated March thirty-first, 1931. Decimal indicating devices of the character disclosed in the application of Boyd, Serial No. 268,510 filed April 18, 1939, which require certain presetting operations by the operator in order to effect an automatic indication of the position of the decimal point in the answer have also been commercially used on the Marchant calculating machine.

I am also aware that it has been proposed to utilize an arrangement such as that disclosed in the Ellerbeck application Serial No. 345,116 filed July twelfth, 1940, whereby the presetting operations required are reduced in number by the provision of means for setting an indication of the position of the decimal point in multiplication during the entry of a multiplier factor, and for then automatically indicating the position of the decimal point in the product.

The principal object of my invention is, therefore, to provide simplified and improved means to obviate the need for mental calculation on the part of a calculating machine operator in determining the decimal point of a product or quotient.

A further object of the invention is to provide a simple and easily manipulable form of decimal indicator.

The manner in which the above and other objects of the invention are accomplished will be readily understood on reference to the following specification when read in conjunction with the accompanying drawings wherein.

Figure 1:
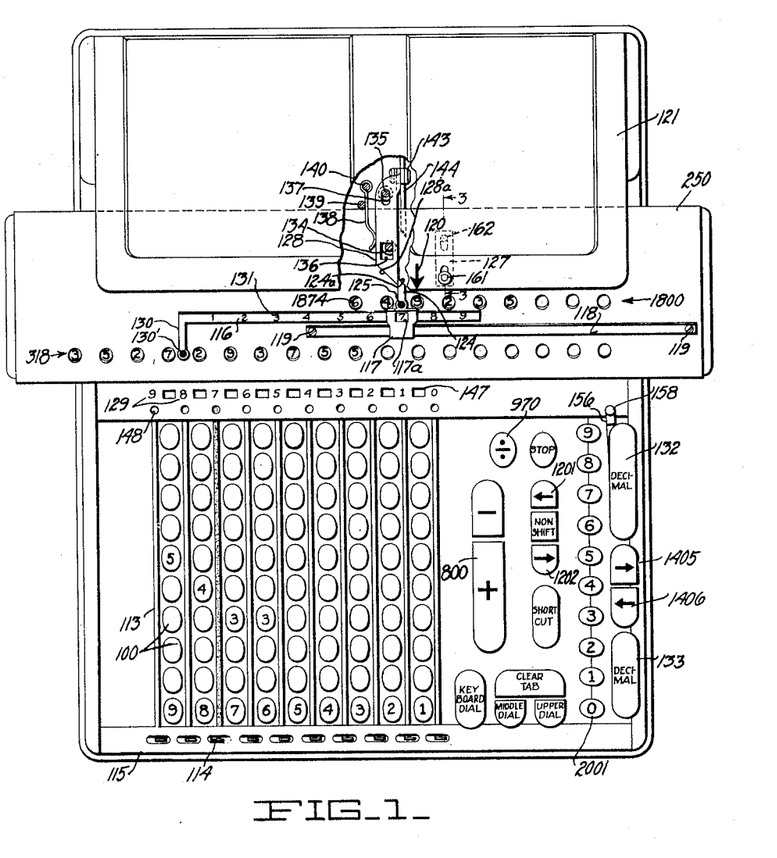
Figure 1 is a plan view of a calculating machine embodying a preferred form of the present invention.

The calculating machine shown in Figure 1 comprises a frame portion 115 on which a carriage 250 carrying an accumulator register 318 and a counter register 1800 is mounted. The carriage is capable of being denominationally shifted step by step by mechanism under control of several depressible keys, including a pair of depressible keys 1405 and 1406 which are provided as disclosed in the aforesaid Avery Patent No. 2,216,659 to effect multiple operations of the carriage shifting mechanism in either direction, the carriage being shifted in the direction of the arrow appearing on the depressed key.

Multiplication is performed as described in detail in the aforesaid Avery patents by setting the multiplicand factor in the keyboard by depression of appropriate ones of the numeral keys 100 whereupon the registration appears in keyboard or selection indicating dials 147 denominationally arranged on the frame 115.

To facilitate reference to the multiplicand decimal point, the usual keyboard decimal markers 113 may be employed. As is well known, the underside of each of the markers 113 is set off in a color contrasting to that of the rest of the keyboard, so that upon rocking the finger-piece 114 of the marker 113 located between the selected denominational orders of the multiplicand set up in the keyboard, the decimal point of the multiplicand may be readily observed.

The multiplier factor is entered into the machine by successively depressing the appropriate ones of a row of multiplier control keys 2001 selected according to the values of the digits of the multiplier factor.

At the conclusion of the operation initiated by each such key, the carriage is automatically shifted in one direction or the other as hereinafter described. The multiplier will, when all digits have been entered, appear in the counter register 1800, while the product will appear in the accumulator register 318. To indicate the position of the carriage, an arrow 120 is formed on the cover 121 which is fixed relative to the frame and is directed toward the counter dial which will be actuated in that position of the carriage.

At the conclusion of the operation initiated by each multiplier key 2001, as noted above in describing the entire sequence of operations, the carriage 250 is automatically shifted one step in a direction determined by pre-setting of one or another of settable direction control keys 1201 and 1202. In usual practice, and for the purpose of the present invention, the upper key 1201 is set to effect a one-step carriage shift to the left after each operation initiated by the multiplier keys.

The carriage is preferably, but not necessarily, shifted to the extreme rightmost position thereof at the start of a calculation. In this position the carriage decimal indicator arrow 120 is aligned with the leftmost counter register dial 1874.

As is well known, the number of digits following the decimal point in any product will be equal to the sum of the number of digits following the decimal point in both the multiplier and multiplicand, and it has been the usual practice in using machines such as those disclosed in the above mentioned patents, to set the multiplier and multiplicand decimal point indicators and then set the product decimal point indicator so that the number of dials to the right thereof equals the number of dials to the right of the multiplier decimal point indicator, plus the number of dials or keyboard rows to the right of the multiplicand decimal point indicator.

In the operation of the above machine during division, the dividend is set up in the value keys 100 in the same manner as the multiplicand is set up, and the appropriate marker 113 is also arranged as previously mentioned. The add bar 800 is then depressed to "add" the dividend into the accumulator register 318. Thereafter the divisor is set up in the value keys 100, generally with the highest figure of the divisor directly aligned with the highest figure in the dividend appearing in the accumulator register. The division control key 970 is then depressed to effect operation of the division control mechanism in the manner described in detail in the above Avery patents, to continuously subtract the divisor from the dividend. When the remainder in the operated orders of the accumulator is reduced to less than that of the controlling orders of the divisor, the carriage is automatically shifted to the left one step, and the process is again started automatically.

Here again the decimal point in the quotient may be found in accordance with prior practice by mental calculation, the difference between the number of dials to the right of the decimal point in the dividend appearing in the accumulator register and the number of dials or rows of keys in the keyboard to the right of the decimal point in the divisor equalling the number of dials to the right of the decimal point in the quotient appearing in the counter register 1800.

My invention provides an improved form of simple device for mechanically carrying out these calculations which are necessary to determine the position of the decimal points in the answers obtained by such machines, and provides for the automatic setting and actuation of the device to the maximum extent which I have found compatible with the retention of the desired simplicity of construction.

In the simplest form of the present invention, a decimal bar 116 (Figures 1 and 2) is adjustably supported by a decimal slide 117 in the form of a clip which, in turn, is frictionally supported by, but slidable along a track 118 secured, as by screws 119, to the cover of the carriage 250. A decimal indicating mark or point 125 is formed on the slide 117 in decimal indicating relationship with the dials of the counter register 1800.

Figures 2, 3, 4:
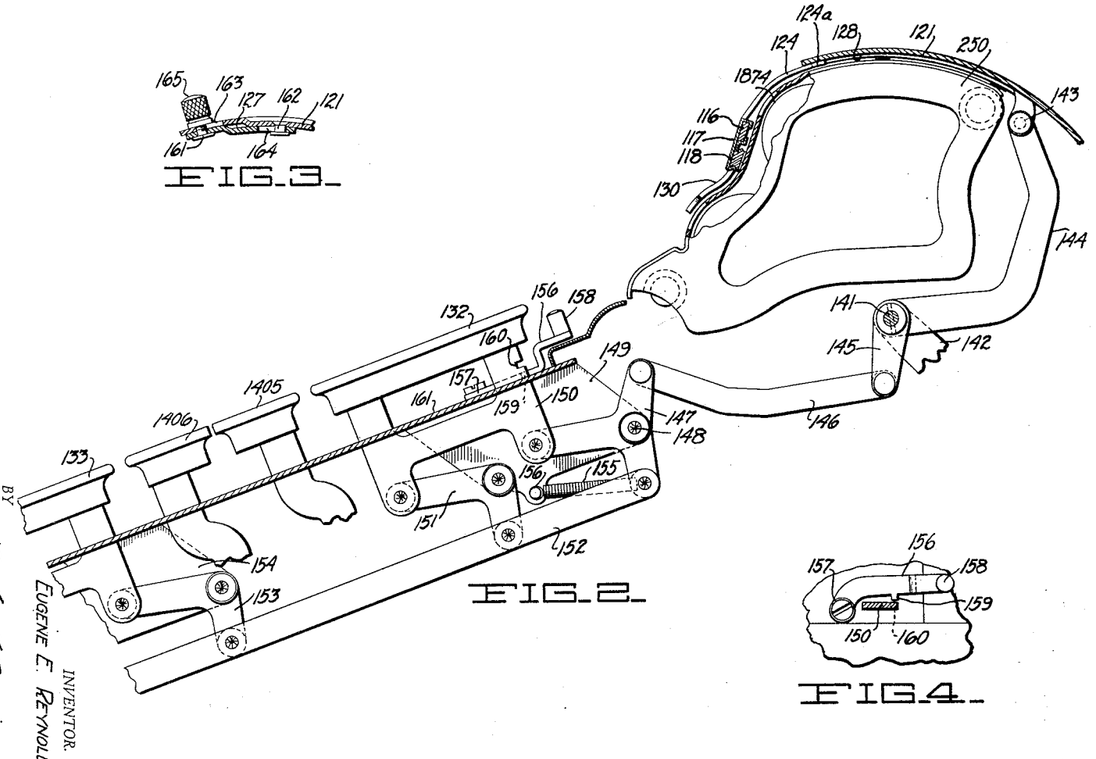
Figure 2 is a side elevation of part of the machine, with parts in section, illustrating the control of the leftmost slide stop by the decimal bars.
Figure 3 is a sectional view through the rightmost decimal slide stop and is taken along the line 3—3 of Figure 1.
Figure 4 is a fragmentary plan view of the decimal bar lock.

The bar 116 is frictionally supported by the slide 117, but is adjustable longitudinally with respect thereto, and has an arm 130 depending therefrom and terminating in a decimal indicating mark 130' arranged in decimal indicating relationship with the accumulator register 318. A series of ordinally spaced and progressively distinguished numerals 131 are formed on the decimal bar 116, the first of these numerals being ordinally spaced from the decimal mark 130 a distance equal to the distance between orders of register 318.

With the device so far described, it will be noted that the decimal point of a product in multiplication may be readily ascertained without the need of mental calculation, and with a minimum amount of manipulation. This is accomplished by adjusting the decimal bar 116 and slide 117 relative to each other, and to the carriage 250.

Assuming for the present that the stops 127 and 128, to be described hereinafter, are rendered ineffective, the bar 116 is adjusted with respect to the slide 117 until the number 131 appearing in a window 117a formed in the slide 117, corresponds to the number of the keyboard dials 147 or rows of keys 100 to the right of the multiplicand decimal point. To facilitate the correct adjustment of the decimal bar 116 relative to the slide 117, a series of numbers 129 preferably are interspersed with the keyboard dials 147 to indicate the number of dials or rows of keys to the right of the aligned decimal marker 113.

An alternative manner of correctly positioning the bar 116 with respect to the slide 117 is first to move the slide 117 to a position to the right of the carriage position indicator arrow 120, and half way between the dial aligned with the arrow and the register dial to the right thereof, and then to adjust the decimal bar 116 to a position in which the accumulator decimal indicating mark 130' thereon is directly aligned with the effective decimal marker 113.

After the bar 116 has been adjusted relative to the slide 117, in either of these ways, and either before, during, or after completion of multiplication, the slide 117 and bar 116 are adjusted as a unit along the track 118, until the decimal indicating mark 125 indicates the known position of the decimal point in the multiplier as it appears in the counter register 1800. The decimal indicating mark 130 will thereby be positioned to indicate the location of the decimal point in the product appearing in the accumulator register 318.

If it is possible to set the multiplicands of a series of successive multiplications without changing the setting of the decimal indicators 113 on the keyboard, the bar 116 need not be adjusted with respect to the slide 117 for each calculation, and the only readjustment required would be the adjustment of the slide 117 to indicate the correct position of the decimal point in each multiplier in the counter register. This latter adjustment may also be dispensed with if it is possible and practical to so enter the multiplier in each case as to avoid necessity for readjustment of slide 117.

To determine the position of the decimal point of a quotient in division calculations using the above described decimal indicating device, the dividend is set up in the keyboard and the appropriate marker 113 is set as usual. Noting the numeral in the series 129 directly above the effective marker 113, the bar 116 is adjusted with respect to the slide 117 until the corresponding numeral appears in the window 117a. The slide 117 is then positioned to the right of the carriage position indicator arrow 120 and halfway between the dial aligned with the arrow and the dial to the right thereof. The slide 117 and bar 116 will thereafter remain fixed relative to the carriage 250.

If the divisor then can be set up with reference to the same decimal marker 113 as was used in setting up the dividend, then the mark 125 on slide 117 will indicate the correct position of the decimal point in the quotient. However, if there are more, or many less digits to the left of the decimal point in the divisor than in the dividend, the position of the decimal point in the divisor must be set to the right or to the left of the former position and to indicate the position of the decimal point in the divisor, a different decimal marker 113 is set. Under such circumstances, the position of the decimal point in the divisor as indicated from the series of numerals 129 in the manner described above, is noted, and the decimal point in the quotient, appearing in the counter 1800, is read as located directly above the position of the corresponding numeral 131 on bar 116.

In the above mentioned multiplication and division calculation, it is preferable that the carriage be shifted to its rightmost position before starting a calculation in order to utilize the full capacity of the machine. However, it is not necessary that this be the case as the device will work equally as well regardless of the position of the carriage when starting a calculation.

While the above described simple form of my invention is useful alone, it is preferred to provide means under control of a pair of decimal keys 132 and 133 to effect setting of the decimal bar 116 during multiplication, thereby reducing the amount of manipulation required on the part of the operator, as well as reducing the amount of time consumed in setting the decimal indicating device. This means comprises a stop 128 which is supported on the under surface of the cover 121 by guide pins 134 and 135 extending through elongated slots 136 and 137, respectively, formed in the stop 128 so as to allow this stop to be shifted longitudinally into and out of the path of a projection 124 of the slide 117 extending under the cover 121. The slot 136 is considerably wider than the diameter of the pin 134, while the slot 137 is of substantially the same width as the diameter of its pin 135. Therefore, the stop 128 is allowed to swing a limited amount about the pin 135 as a pivot. The stop 128 is, however, normally urged toward the right by a small leaf spring 138 supported by pins 139 and 140 upon the under surface of the cover 121, and in either case extends just to the left of the arrow 120.

As shown in Figure 2, the cover 121 and stop member 128 are curved on a radius about a rod 141 as a center, which rod is suitably journaled in brackets 142 extending from the main frame of the machine. Stop 128 is loosely pivoted at 143 to an arm 144 which is securely pinned to the rod 141, the pivotal connection 143 being loose enough to permit the pivotal movement of stop 128 about pin 135 as heretofore described. An arm 145, also pinned to the rod 141, is connected by means of a link 146 to a three-arm lever 147 pivoted at 148 to a stationary bracket 149. One arm of the lever 147 pivotally supports one end of a key frame 150 of an upper decimal bar 132, while the other end of the frame is supported by a lever 151 also pivoted to the bracket 149. A link 152 is pivotally connected between the levers 147 and 151 forming a parallel link arrangement. The link 152 extends forward and is pivotally connected to corresponding levers, one of which is showed at 153, pivotally mounted on a stationary bracket 154 for the purpose of supporting a lever decimal bar 133 in a manner similar to that in which the bar 132 is supported.

A spring 155 is tensioned between the pin connecting the link 162 with the lever 147 and a pin 156 on the bracket 149 to normally hold the decimal bars 132 and 133 in a raised position wherein the forward edge of the stop 128 (Figures 1 and 2) is held in the path of the projection 124 of slide 117. Upon depression of one or the other of the decimal bars 132 and 133 against the action of spring 155, the link 146 and arms 144 and 145 are moved to retract the stop 128 rearwardly of the machine and out of the path of movement of the projection 124 on slide 117. Upon such retraction of the stop 128, the slide 117 will be free to be moved along with the carriage 250 during a carriage shifting operation.

The friction between the slide 117 and the slide track 118 is such that upon a leftward shift of the carriage with the projection 124 of slide 117 to the right of the stop 128, the projection 124 will rock the stop 128 against the action of spring 138 in a counter-clockwise direction about the pin 135 as far as permitted by pin 134 before slippage will occur between the slide 117 and the track 118. Therefore, after the projection 124 has once contacted the stop 128 during a leftward carriage shift, it will maintain the stop in a clockwise rocked position as shown in Figure 1 at the end of each carriage shift, whether such shift should be for one or more steps. When the slide 117 is so arrested by the stop 128 after bending the spring 138, the mark 125 will be positioned to the left of the arrow 120 by an amount equal to one-half the ordinal distance between two adjacent dials.

If, after the carriage has come to rest in one of its several positions after the above leftward shift, one of the decimal bars 132 and 133 be depressed, the stop 128 will be retracted from engagement with the projection 124, allowing the leaf spring 138 to rock the stop clockwise. Thus, when the decimal bars 132 and 133 are allowed to be raised by spring 155, the inclined edge 128a of stop 128 will engage the inclined right edge 124a of the projection 124. Therefore the stop will be prevented from thereafter arresting movement of slide 117 and bar 116 carried thereby, during subsequent shifting movement of the carriage toward the left.

In order to maintain the stop 128 out of the path of movement of the projection 124 of slide 117 for extended periods, if desired, a lock 156 (Figures 1, 2, and 4) may be provided. Lock 156 is pivoted at 157 to the top plate 161 of the keyboard section, and has a knob 158 extending from the rearmost end thereof whereby the lock 156 may be rocked about its pivot 157 to carry a projection 159 thereon in or out of a notch 160 formed in the key frame 150 of the decimal bar 132. To lock the stop 128 out of the path of the projection 124, the decimal bar 132 is depressed to align the notch 160 therein with the projection 159 so that upon rocking the lock 156 clockwise the projection thereon will enter the notch 160 and prevent raising of the bars 132 and 133 by the spring 155.

A second stop 127 is spaced to the right of the carriage position indicator arrow 120 by an amount sufficient to enable it to engage the projection 124 of slide 117 when the slide is moved to the right of the arrow 120, or in other words, when the slide is moved rightward to point off a decimal position just to the right of the arrow.

Stop 127 is adjustable longitudinally into and out of the path of the projection 124, being frictionally held in either position, and is supported on the under surface of the cover 121 by pins 161 and 162 (Figures 1 and 3). Pin 161 extends through an elongated slot 163 in the cover 121 and is secured to a knob 165 which may be grasped to move the stop 127 back and forth. The pin 162 is secured in the cover 121 and extends through an elongated slot 164 in the stop 127.

When the carriage is shifted to the right toward its rightmost end position, or to any other desired position, the stop 127 is adapted to engage projection 124 of slide 117 and then maintain it in position just to the right of the arrow 120 so that it will be in a correct position for a subsequent multiplication or division calculation wherein it is desired to determine the decimal point of the result. Also the friction between the slide 117 and the track bar 118 is such that if the slide 117 is situated to the left of the stop 128, shifting of the carriage 250 to the right toward a starting position will cause the inclined edge 124a of projection 124 to engage the inclined end 128a of stop 128 and cam the stop 128 rearwardly, enabling the slide 117 to pass it. As the slide 117 passes the stop 128, the spring 155 is allowed to again move the stop 128 into arresting position relative to the projection 124.

To illustrate the operation of this form of my device during multiplication, employing the decimal bars 132 and 133 to control setting of the decimal point indicators, assume the following example:

$$64.9235 \times 54.33 = 3527.293755$$

Also, assume that the operator sets the carriage to the extreme right hand position as by depressing the upper shift key 1405 and that he also sets the multiplicand 54.33 in the leftmost rows of keys 100, as illustrated in Figure 1, in which condition the multiplicand decimal position would be indicated by the numeral "7" in the series of numerals 129. Therefore, the operator should adjust the decimal bar 116 until the numeral "7" appears in the window 117a of slide 117.

With the stop 127 in effective position, the slide 117 will have been positioned against the said stop 127 by the rightward shift of the carriage as was described hereinabove, and will be in correct starting position.

Thereafter, the operator depresses the multiplier keys 2001, first the "6" key, and then the "4" key, et cetera, the carriage being automatically shifted one step toward the left after actuation of the machine under control of each key. After the carriage has shifted, upon completion of actuation of the machine under control of the first, or "6" multiplier key, the projection 124 of slide 117 will have rocked the stop 128 clockwise about the pin 135 an amount permitted by pin 134. During the carriage shift following the depression of the "4" multiplier key, the stop 128 will prevent shifting of the slide 117 relative to the frame. Now, upon (and never before) completion of the carriage shift following the depression of the "4" multiplier key, the operator should depress one or the other of the decimal bars 132 and 133, depending upon which is the most convenient. This may be done concurrently with depression of the next, or "9" multiplier key. The stop 128 is thereby removed from arresting position, enabling the slide 117 to travel along with the carriage from then on. At this time the mark 125 on the slide 117 indicates the decimal point of the multiplier appearing in the counter register 1800, while the mark 130 on the bar 116 correctly indicates the decimal point of the product appearing in the accumulator register 318.

As mentioned before, if the multiplicand of a series of multiplication problems can be set around the same decimal point of marker 113 on the keyboard, the slide 116 will not need to be adjusted for each new problem. It will be restored to starting position by movement of the carriage to the right, and automatically reset during the entry of each new multiplier. The only manipulation necessary will be the depression of the one or the other of the decimal bars 132 and 133 at the correct time, and this can be conveniently done at the same time a multiplier key is depressed.

Division may be performed in the manner described hereinabove, the stop 127 acting to arrest the slide 117 in the proper position just to the right of the carriage indicator arrow 120 when the carriage is being shifted toward the right to its starting position. The stop 128 must, in division operation, be removed from arresting position by locking the decimal bars 132 and 133 depressed by the lock 156, as described hereinabove.

Figure 5:
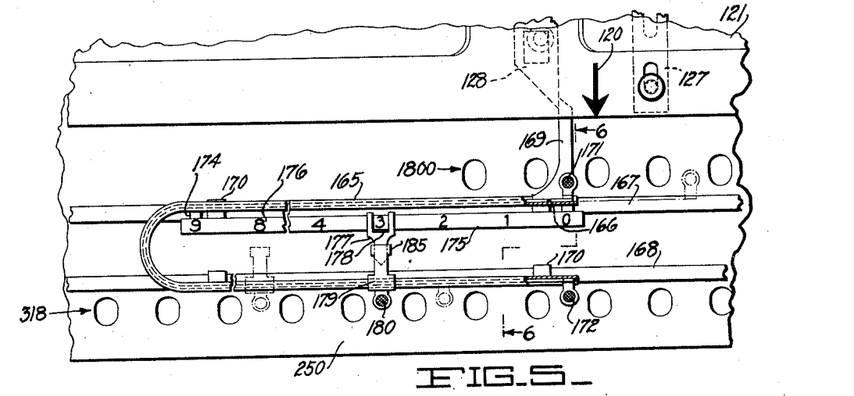
Figure 5 is a plan view of part of the calculating machine embodying a modified form of the invention.
Figure 6:
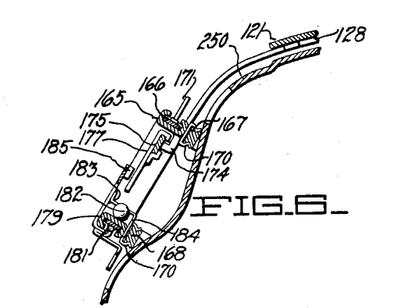
Figure 6 is a transverse sectional view taken along the line 6—6 of Figure 5.

Figures 5 and 6 illustrate a modified form of the invention which especially facilitates the determination of the position of the decimal point in a quotient in division, while also facilitating the determination of the position of the decimal point of a product in multiplication. The stops 127 and 128 and control means therefor including the decimal bars 132 and 133, are preferably employed (see Figures 1 and 2).

However, in this embodiment, a U-shaped track 165 is provided, being mounted on clips 170 adjustable along a pair of parallel slide tracks 167 and 168 suitably secured to the cover of the carriage 250. A projection 169, corresponding in purpose to the projection 124 of Figures 1 and 2, extends upwardly from the track 165, and is adapted to cooperate with the stops 127 and 128 in a manner similar to that disclosed in connection with Figures 1 and 2.

The track 165 is C-shaped in cross section (see Figure 6), and a flexible strip 166 of spring metal is slidably retained therein. A pair of decimal marked signs or indicators at 171 and 172 are mounted on the opposite ends of the strip 166, the former indicator extending into decimal indicating relationship with the counter register 1800 while the latter indicator 172 extends into decimal indicating relationship with the accumulator register 318.

Extending parallel to the track 165, and secured by brackets 174 to the upper leg of said track, is a scale 175 provided with ordinally arranged progressively distinguished indicia 176 illustrated as numerals "0" to "9," which correspond to the ordinally spaced series of numerals 129 (Figure 1) of the keyboard.

Fitted on the scale 175 for sliding movement therealong, is a slide 177 having a window 178 thereon adapted to be registered with one or another of the numerals 176 for the purpose of facilitating movement of the slide 177 to a position corresponding to the position of the decimal point in an amount set in the keyboard. A decimal indicating slide 179 is slidably adjustable along the lower leg of the track 165, and has a mark 180 extending into decimal indicating relationship with the dials of the accumulator register 318. The slide 179 has a portion thereof extending around the bottom of the lower leg of track 165 and terminating in a friction shoe 181 (Figure 6) of a material such as rubber, which normally bears upon the strip 166 and, when the slide 179 is in its normal position illustrated in Figure 6, frictionally engages the strip 166 so that it is moved along the track 165 with the slide 179 when said slide is moved therealong. The slide 179 is supported on the top of the lower leg of the track by a ball bearing 182 held in place by a strip 183 of spring metal through a hole in which the ball 182 partially extends, and which is suitably secured to the rear of the slide 179. The strip 183 has a leg 184 thereon extending around the rear edge of the lower leg of the track 165 to guide and retain the slide on the track.

The slide 179 has a pair of spaced ears 185 formed on the upper extending portion thereof which, when this slide is in alignment with the slide 177, may be moved inwardly to embrace the edges of the slide 177. By pressing inwardly toward the cover of the carriage 250 on the upper tip of the slide 179, these two slides may be connected together and slid as a unit along the scale 175 and track 165. When the tip of the slide 179 is pressed inwardly in this manner, to connect the same with the slide 177, it rocks about the ball bearing 182 to remove the friction shoe 181 from engagement with the strip 166, and thus permit movement of the slides 177 and 179 independently of the strip 166.

In setting and operating the device of Figures 5 and 6 to indicate the decimal point of a product in multiplication, the track 165 is moved to the right until the projection 169 thereon abuts the stop 127. This may be accomplished either manually or by shifting the carriage to the right into a starting position in the manner described in connection with the device illustrated in Figures 1 and 2.

The strip 166 is then adjusted by means of the slide 179 until the decimal mark 171 registers with the zero on the track 175. The slide 177 is then adjusted along the scale 175 until it is aligned with the slide 179 and then, by pressing inwardly on the upper tip of the slide 179, both slides are moved along the track 165 and scale 175 until the window 178 registers with a numeral 176 corresponding to the numeral in the series 129 (Figure 1) aligned with the set decimal marker 113 indicating the position of the decimal point in the multiplicand set in the keyboard. The slide 179 is then allowed to assume its normal position illustrated in Figure 6 and the machine is operated as usual by depressing the various multiplier keys 2001 (Figure 1) according to the value of the multiplier.

When the automatic carriage shift, following depression of the first multiplier key occurs, the projection 169 will be moved into contact with the stop 128 and will rock the same slightly toward the left, causing the leaf spring 138 to yield in the same manner as described hereinbefore. Then, after the multiplier key corresponding to the last whole number digit in the multiplier is depressed and the carriage is automatically shifted one step to the left subsequent to the actuation initiated thereby, one of the decimal bars 132 and 133 is depressed to remove the stop 128 from its normal arresting position. The track 165 will then be allowed to move along with the carriage 250, the mark 171 indicating the position of the decimal point in the multiplier appearing in the counter register 1800, while the decimal indicating mark 180 will indicate the position of the decimal pont of the product appearing in the accumulator register 318.

In the event that the multiplicand consists entirely of whole numbers and the rightmost digit of this amount is set in the rightmost bank of keys of the keyboard, it will not be necessary to use the slide 177 at all, and slide 179 will be used only for positioning the decimal point indicator 171 in registry with zero on the scale 175. Having so adjusted the indicator 171, the lower decimal point 172 will automatically be so arranged as to correctly set off the decimal position in the product.

In division the track 165 is also brought to a rightmost position wherein the projection 169 abuts the stop 127; but the stop 128 is rendered ineffective in the manner heretofore described.

If the problem is such that the dividend and the divisor can both be properly set with reference to the same set decimal marker 113 without shifting the carriage between setting of these factors, the pointer 171 need only be set in registry with the zero on scale 175, in which position it will correctly indicate the position of the decimal point in the quotient. However, if the divisor contains more or many less digits to the left of the decimal point than the dividend, or whenever desired, the following procedure is followed.

The dividend is set into the machine as usual and, with the decimal indicator 171 arranged at zero registration relative to the scale 175, the slides 177 and 179 are adjusted together without displacing the spring strip 166, in a manner described hereinbefore, until the window 178 in slide 177 registers with the numeral on scale 175 corresponding to the numeral of the series 129 (Figure 1) aligned with the set decimal marker 113 of the dividend. After the dividend is added into the accumulator register, the divisor is set up in the keyboard in the usual manner, with the highest digit thereof in alignment with the highest digit of the dividend. Then, with the slide 179 in its normal position (illustrated in Figure 6 wherein it grips the strip 166 carrying the decimal marks 171 and 172), said slide is moved into alignment with a numeral on the scale 175 corresponding to the position of the decimal point in the divisor as ascertained by reference to the series of numerals 129. The mark 171 will then correctly indicate the position of the decimal point in the quotient.

This holds true regardless of whether the position of the divisor's decimal point is to one side or the other of that of the dividend, or in other words, regardless of whether the divisor is larger or smaller than the dividend. In either case, movement of the slide 179 to correctly indicate the position of the decimal point in the divisor will produce an equal and opposite movement of the mark 171. At the same time, the slide 177 remains fixed relative to the scale 175 so that subsequent division problems may be worked using the same dividend decimal point without requiring adjustment of the slide 177. The only adjustment needed in such cases is the adjustment of the slide 179 into a position corresponding to the decimal point of the new divisor. If it is also possible to enter the different divisors in the keyboard about the same divisor decimal point, adjustment of the slide 179 before each division problem may also be dispensed with.

Figure 7:
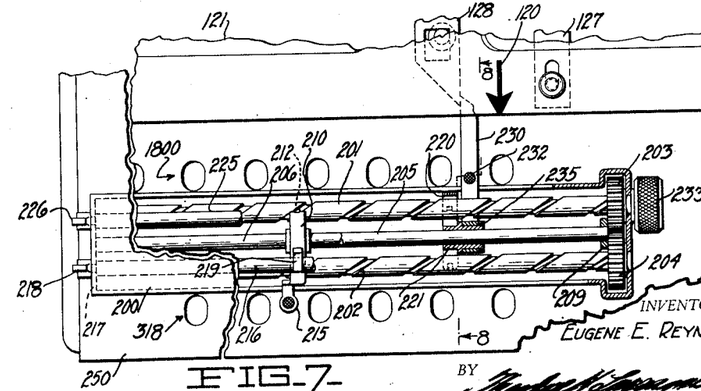
Figure 7 is a plan view of part of the machine embodying still another modified form of the invention.
Figure 8:
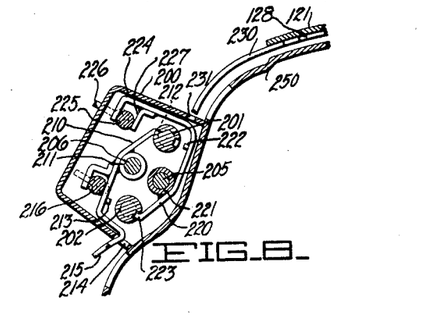
Figure 8 is a transverse sectional view taken along the line 8—8 of Figure 7.

Figures 7 and 8 illustrate another modified form of decimal indicating device of the present invention which automatically effects indication of the position of the decimal points in products and quotients in multiplication and division problems respectively. In this embodiment, stops 127 and 128, and control means including the decimal bars 132 and 133 are preferably employed as disclosed in connection with Figures 1 and 2 to control setting of the decimal point. The device is housed in a cover 200 adapted to be secured to the cover of the carriage 250 and comprises a pair of spirally grooved rods 201 and 202 extending parallel to each other and journaled in bearings formed in the ends of the housing cover 200. The spiral grooves in rods 201 and 202 extend in parallel angular relation to each other. However, the rods are connected together by gears 203 and 204 so that rotation of one of the rods in one direction causes an equal and opposite rotation of the other rod.

A pair of rods 205 and 206 are arranged intermediate the grooved rods 201 and 202 and are fixed at their leftmost ends in the left hand cover of the housing cover 200, while the right hand ends thereof are fixed in a bracket 209 (Figure 7) secured to the housing cover 200.

A slide 210 is mounted on a bushing 211 slidable along the upper rod 206, and has a pair of downwardly extending teeth 212 and 213 formed thereon, the former tooth being adapted to engage with the spiral groove of the rod 201 while the latter tooth is adapted to be engaged with the spiral groove of the rod 202, depending upon which way the slide 201 is rocked about the shaft 206. The slide 210 also has a tab portion 215 extending through an elongated slot 214 in the cover 200 into decimal indicating relationship with the dials of the accumulator register 318, a decimal point being preferably inscribed thereon.

An eccentrically mounted rod 216 is journaled at opposite ends thereof in the end plate 217 of the cover 200 and in the bracket 209, and is provided with a handle 218 secured to the outer end thereof. This rod 216 contacts the upper surface of the slide 210 at one side of the rod 206 and also contacts, at a diametrically opposite point thereon, a follower 219 secured to the slide 210. Thus, by rocking the handle 218, the eccentric rod 216 may rock the slide 210 to engage either of the teeth 212 and 213 with its corresponding spirally grooved rod, regardless of the position of the slide along the rod 206.

A second slide 220 is mounted on a bushing 221 slidable along the lower rod 205, and is provided with upwardly extended teeth 222 and 223 thereon adapted to engage the spirally grooved rods 201 and 202, respectively. The slide 220 has an upwardly extending portion 224 thereon which is bent over to contact the surface of an eccentrically mounted rod 225 similar to the rod 216, and a follower 227 is fixed to the upwardly extending portion 224 of slide 220 to contact the rod 225 at a point opposite that contacted by the portion 224, whereby rocking of the rod 225 is effective to selectively engage either of the teeth 222 and 223 with their respective spirally grooved rods 201 and 202. Rod 225 is also mounted in the end cover 217 of the cover 200 at one end thereof and in the bracket 209 at the opposite end thereof. A handle 226 is secured to the rod 225 to facilitate rocking thereof for this purpose.

By adjusting either of the rods 216 and 225 into an intermediate position, its corresponding slide will be rocked to a position out of engagement with both of the spirally grooved rods 201 and 202 whereby the slide may be moved longitudinally along the rods to any desired position.

Bushing 221 has an extended portion formed thereon (see Figure 7) on which is pivotally retained, by means of a ring 235, a projection 230 extending upwardly under the cover 121 of the machine and adapted to engage one or another of the stops 127 and 218 in the same manner, and for the same purpose as the projection 124 of Figures 1 and 2. Projection 230 extends through a slot 231 in the housing cover 200, and has a decimal indicating mark 232 inscribed thereon which is disposed in decimal indicating relationship with the dials of the counter register 1800.

The spiral grooves of the rods 201 and 202 are shown as having a pitch equal to the ordinal distance between adjacent dials of the accumulator and counter registers and should extend at such an angle relative to the axes of the rods that longitudinal movement of either slide 220 or 210 relative to the carriage will effect rotation of the rod 201 or 202 to which the slide is connected. However, this angle should also be such that rotation of the rods, as by a knob 233 (Figure 7) fixed to the rod 201, will effect longitudinal movement of whichever of the slides 210 and 220 is in engagement therewith.

In setting and operating the device in multiplication to point off the correct decimal point of the product, the following procedure is preferable. The projection 230 is first brought into contact with the stop 127 by shifting the carriage to the right into its rightmost or starting position, in the same manner as described hereinbefore. Then, if one of the teeth 222 and 223 of the slide 220 is not already in engagement with the respective grooved rod, the eccentric rod 225 is rocked by the handle 226 to engage the slide 220 in either of these grooved rods. The slide 210 is now rocked by means of the rod 216 and handle 218, until it is out of contact with both of the rods 201 and 202, and it is then shifted along the rod 206 by grasping and moving the tab 215 until it is directly aligned with the set decimal marker 113 of the multiplicand in the keyboard. Thereafter the slide 210 is rocked into engagement with the same grooved rod with which the slide 220 is in engagement so that rotation of one of the rods will effect equal movement of the slides 210 and 220 in the same direction.

After the device has been set in the above described condition, the multiplication is performed as usual. The first automatic shift of the carriage following the depression of the first multiplier keys serves to merely shift the projection 230 into contact with the stop 128 and to slightly rock the latter against the action of its spring 138 (Figure 1). During a second automatic shift following depression of a second multiplier key (providing the decimal bar 132 or 133 has not been depressed), the stop 128 will prevent movement of the projection 230 and slide 220 along with the carriage and will consequently cause whichever rod slide 220 is in engagement with to rotate the rod and therefore cause the same relative movement to be effected between the slide 210 and the carriage.

As described hereinbfore in connection with other forms of the invention, when a decimal bar 132 or 133 is depressed, the stop 128 will be released, and during subsequent automatic carriage shifts following depression of multiplier keys the slides 210 and 220 will follow along with the carriage, the decimal indicating points 215 and 232 indicating the correct positions of the decimal points in the product and multiplier, respectively.

If in subsequent multiplication problems it is possible to set the multiplicand with reference to the same decimal marker 113 on the keyboard, it will not be necessary to readjust the setting of the slides 210 and 220. The mere act of returning the carriage to the right for the new starting position will reset the slides to again indicate the correct position of the decimal point in the product, as well as the multiplier when the decimal bars 132 and 133 are depressed at the correct point in the next multiplication operation.

In division, the projection 230 is also brought into contact with the stop 127, preferably by shifting the carriage to the right into starting position. At this time the slide 210, if it is not already disengaged from both rods 201 and 202, is so disengaged by manipulation of a handle 218 and is slid along its supporting rod 206 until it is vertically aligned with the decimal marker 113 with reference to which the dividend is set in the keyboard. The slides 210 and 220 are then engaged with different ones of the rods 201 and 202 so as to enable them to be moved in opposite directions upon rotation of the rods. For example, if the slide 220 is rocked to engage its tooth 222 with the spiral groove of rod 201, then the slide 210 should be rocked to engage its tooth 213 with the spiral groove of rod 202.

After entering the dividend in the accumulator register, the divisor may be set up in the keyboard with the highest digit thereof in alignment with the highest digit appearing in the accumulator. The operator now turns the knob 233 to shift the slide 210 until its decimal indicating mark 215 is in direct alignment with the position of the decimal position in the divisor set up in the keyboard. During this adjustment of the slide 210, and the ensuing calculation, both of the stops 127 and 128 should be removed from their effective arresting positions in the manner described hereinbefore, to allow the projection 230 to be shifted in a direction opposite to that of movement of the slide 210. The decimal indicating mark 232 will thus indicate the correct position of the decimal point in the quotient appearing in the counter register 1800.

It will be seen from the above description, that decimal indicating devices made in accordance with my present invention are readily capable of indicating the position of the decimal points in products and quotients in multiplication and division problems with a minimum amount of manipulation and mental effort on the part of the operator, and although I have described my invention in detail and therefore utilized certain specific terms and language herein, it is to be understood that the present disclosure is illustrative, rather than restrictive, and that changes and modifications may be resorted to without departing from the spirit or the scope of the claims appended hereto.

I claim:

1. In a calculating machine having a frame supporting value selecting devices, differential actuating mechanism controlled by said devices, and a carriage carrying registering mechanism operable by said differential actuating mechanism and ordinally shiftable with respect thereto; the combination of a decimal indicator adjustable in decimal indicating relationship with said registering mechanism, means operable upon ordinal shifting of the registering mechanism for concurrently effecting ordinal shifting of said decimal indicator to maintain unchanged the indicated position of the decimal point in amounts displayed by said registering mechanism, means for preventing ordinal shifting of said decimal indicator concurrently with ordinal shifting of said registering mechanism to effect successive changes in the indicated position of the decimal point in amounts displayed by said registering mechanism upon ordinal shifting of the latter, and mechanism selectively operable to render one of said means effective and the other ineffective.

2. In a calculating machine having a frame supporting value selecting devices, differential actuating mechanism controlled by said devices, and a carriage carrying registering mechanism operable by said differential actuating mechanism and ordinally shiftable with respect thereto; the combination of a decimal indicator mounted on said carriage and adjustable in decimal indicating relationship with said registering mechanism, and means for effecting ordinal shifting of said registering mechanism with respect to said decimal indicator and thus successively changing the indicated position of the decimal point in amounts displayed by said registering mechanism, said means comprising a selectively settable stop for said indicator, with respect to which stop said carriage is ordinally shiftable.

3. In a calculating machine having a frame supporting value selecting devices, differential actuating mechanism controlled by said devices, and a carriage carrying registering mechanism operable by said differential actuating mechanism and ordinally shiftable with respect thereto; the combination of a decimal indicator mounted on said carriage and adjustable in decimal indicating relationship with said registering mechanism, means for effecting ordinal shifting of said carriage in either direction with respect to said decimal indicator and thus successively changing the indicated position of the decimal point in amounts displayed by said registering mechanism; said means comprising a pair of ordinally spaced stops for said indicator, with respect to which stops said carriage is ordinally shiftable; and means selectively operable to render one of said stops ineffective.

4. In a calculating machine having a frame supporting value selecting devices, differential actuating mechanism controlled by said devices, a carriage carrying registering mechanism operable by said differential actuating mechanism and ordinally shiftable with respect thereto, and means for shifting said carriage; the combination of a decimal indicator mounted on said carriage and adjustable in decimal indicating relationship with said registering mechanism, a yieldably mounted stop extending into the path of movement of said indicator to prevent movement thereof with said carriage in one direction, but capable of movement on said mounting to permit movement of said indicator with the carriage in the opposite direction, means automatically effective upon movement of said carriage in said opposite direction for moving said yieldably mounted stop on its said mounting out of the path of movement of said indicator, and manually controlled means for withdrawing said stop from the path of movement of said indicator.

5. In a calculating machine having a frame supporting value selecting devices, differential actuating mechanism controlled by said devices, a carriage carrying registering mechanism operable by said differential actuating mechanism and ordinally shiftable with respect thereto, and means for shifting said carriage; the combination of a decimal indicator mounted on said carriage and adjustable in decimal indicating relationship with said registering mechanism, a yieldably mounted stop extending into the path of movement of said indicator to prevent movement thereof with said carriage in one direction, but capable of movement on said mounting to permit movement of said indicator with the carriage in the opposite direction, a resetting stop ordinally spaced from said yieldably mounted stop and extending into the path of movement of said indicator to prevent movement thereof with said carriage in the direction opposite to that in which said yieldable stop is capable of preventing such movement, means automatically effective upon movement of said carriage in said opposite direction for moving said yieldably mounted stop on its said mounting out of the path of movement of said indicator, and manually controlled means for withdrawing said yieldably mounted stop from the path of movement of said indicator.

6. In a calculating machine having a frame supporting value selecting devices, differential actuating mechanism controlled by said devices, counter actuating mechanism, and a carriage carrying an accumulator and a counter operable by said actuating mechanisms respectively and ordinally shiftable with respect to said actuating mechanisms; the combination of a first decimal indicator adjustable in decimal indicating relationship with said accumulator, a second decimal indicator adjustable in decimal indicating relationship with said counter, means operable upon ordinal shifting of the registering mechanism for concurrently effecting ordinal shifting of said decimal indicators to maintain unchanged the indicated positions of the decimal points in amounts displayed by said accumulator and counter, means for preventing ordinal shifting of said decimal indicators concurrent with ordinal shifting of said carriage to effect successive changes in the indicated positions of the decimal points in amounts displayed by said accumulator and counter upon ordinal shifting of said carriage, and mechanism selectively operable to render one of said means effective and the other ineffective.

7. In a calculating machine having a frame supporting value selecting devices, differential actuating mechanism controlled by said devices, counter actuating mechanism, and a carriage carrying an accumulator and a counter operable by said actuating mechanisms respectively and ordinally shiftable with respect to said actuating mechanisms; the combination of a first decimal indicator adjustable in decimal indicating relationship with said accumulator, a second decimal indicator adjustable in decimal indicating relationship with said counter, a releasable connection between said first and second decimal indicators whereby the same may be simultaneously or separately adjusted in decimal indicating relationship with their respective registers, means operable upon ordinal shifting of the registering mechanism for concurrently effecting ordinal shifting of said decimal indicators to maintain unchanged the indicated positions of the decimal points in amounts displayed by said accumulator and counter, means for preventing ordinal shifting of said decimal indicators concurrently with ordinal shifting of said carriage to effect successive changes in the indicated positions of the decimal points in amounts displayed by said accumulator and counter upon ordinal shifting of said carriage, and mechanism selectively operable to render one of said means effective and the other ineffective.

8. In a calculating machine having a frame supporting value selecting devices, differential actuating mechanism controlled by said devices, counter actuating mechanism, and a carriage carrying an accumulator and a counter operable by said actuating mechanisms respectively and ordinally shiftable with respect to said actuating mechanisms; the combination of a first decimal indicator mounted on said carriage and adjustable in decimal indicating relationship with said accumulator, a second decimal indicator mounted on said carriage and adjustable in decimal indicating relationship with said counter, a releasable connection between said first and second decimal indicators whereby the same may be simultaneously or separately adjusted in decimal indicating relationship with their respective registers, and means for effecting ordinal shifting of said accumulator and said counter with reference to their respective decimal indicators and thus successively changing the indicated positions of the decimal points in amounts displayed by said accumulator and counter; said means comprising a selectively settable stop means cooperating with both of said indicators, with respect to which stop means said carriage is ordinally shiftable.

9. In a calculating machine having a frame supporting value selecting devices, differential actuating mechanism controlled by said devices, counter actuating mechanism, and a carriage carrying an accumulator and a counter operable by said actuating mechanisms respectively and ordinally shiftable with respect to said actuating mechanisms; the combination of a first decimal indicator mounted on said carriage and adjustable in decimal indicating relationship with said accumulator, a second decimal indicator mounted on said carriage and adjustable in decimal indicating relationship with said counter, and means for effecting ordinal shifting of said accumulator and said counter with reference to their respective decimal indicators and thus successively changing the indicated positions of the decimal points in amounts displayed by said accumulator and counter; said means comprising a selectively settable stop means cooperating with both of said indicators, with respect to which stop means said carriage is ordinally shiftable.

10. In a calculating machine having a frame supporting value selecting devices, differential actuating mechanism controlled by said devices, counter actuating mechanism, and a carriage carrying an accumulator and a counter operable by said actuating mechanisms respectively, and ordinally shiftable with respect to said actuating mechanisms; the combination of a first decimal indicator mounted on said carriage and adjustable in decimal indicating relationship with said accumulator, a second decimal indicator mounted on said carriage and adjustable in decimal indicating relationship with said counter, a releasable connection between said first and second decimal indicators whereby the same may be simultaneously or separately adjusted in decimal indicating relationship with their respective registers, means for effecting ordinal shifting of said accumulator and said counter in either direction with reference to their respective decimal indicators and thus successively changing the indicated positions of the decimal points in amounts displayed by said accumulator and counter; said means comprising paired ordinally spaced stop means cooperating with both of said indicators, with respect to which stop means said carriage is ordinally shiftable; and means selectively operable to render one of said paired stop means ineffective.

11. In a calculating machine having a frame supporting value selecting devices, differential actuating mechanism controlled by said devices, counter actuating mechanism, and a carriage carrying an accumulator and a counter operable by said actuating mechanisms respectively, and ordinally shiftable with respect to said actuating mechanisms; the combination of a first decimal indicator mounted on said carriage and adjustable in decimal indicating relationship with said accumulator, a second decimal indicator mounted on said carriage and adjustable in decimal indicating relationship with said counter, means for effecting ordinal shifting of said accumulator and said counter in either direction with reference to their respective decimal indicators and thus successively changing the indicated positions of the decimal points in amounts displayed by said accumulator and counter; said means comprising paired ordinally spaced stop means cooperating with both of said indicators, with respect to which stop means said carriage is ordinally shiftable; and means selectively operable to render one of said paired stop means ineffective.

12. In a calculating machine having a frame supporting value selecting devices, differential actuating mechanism controlled by said devices, counter actuating mechanism, a carriage carrying an accumulator and a counter operable by said actuating mechanisms respectively and ordinally shiftable with respect thereto, and means for shifting said carriage; the combination of a first decimal indicator mounted on said carriage and adjustable in decimal indicating relationship with said accumulator, a second decimal indicator mounted on said carriage and adjustable in decimal indicating relationship with said counter, a releasable connection between said first and second decimal indicators whereby the same may be simultaneously or separately adjusted in decimal indicating relationship with their respective registers, a yieldably mounted stop extending adjacent the path of movement of said carriage to prevent movement of said indicators with said carriage in one direction, but capable of movement on said mounting to permit movement of said indicators with the carriage in the opposite direction, means automatically effective upon movement of said carriage in said opposite direction for moving said yieldably mounted stop on its said mounting to permit movement of said indicators past the same, and manually controlled means for rendering said stop ineffective to prevent movement of said indicators with said carriage in said one direction.

13. In a calculating machine having a frame supporting value selecting devices, differential actuating mechanism controlled by said devices, counter actuating mechanism, a carriage carrying an accumulator and a counter operable by said actuating mechanisms respectively and ordinally shiftable with respect thereto, and means for shifting said carriage; the combination of a first decimal indicator mounted on said carriage and adjustable in decimal indicating relationship with said accumulator, a second decimal indicator mounted on said carriage and adjustable in decimal indicating relationship with said counter, a releasable connection between said first and second decimal indicators whereby the same may be simultaneously or separately adjusted in decimal indicating relationship with their respective registers, a yieldably mounted stop extending adjacent the path of movement of said carriage to prevent movement of said indicators with said carriage in one direction, but capable of movement on said mounting to permit movement of said indicators with the carriage in the opposite direction, a resetting stop ordinally spaced from said yieldably mounted stop and extending adjacent the path of movement of said carriage to prevent movement of said indicators with said carriage in the direction opposite to that in which said yieldable stop is capable of preventing such movement, means automatically effective upon movement of said carriage in said opposite direction for moving said yieldably mounted stop on its said mounting to permit movement of said indicators past the same, and manually controlled means for rendering said yieldably mounted stop ineffective to prevent movement of said indicators with said carriage in said one direction.

14. In a calculating machine having a frame carrying selection mechanism upon which an amount may be set, including denominationally arranged means for indicating an amount entered thereinto, a series of progressively distinguished indicia each indicia indicating a denomination of said amount indicating means, and a carriage carrying a product register transversely shiftable relative to said frame; the combination of a decimal indicating device adjustably supported by said carriage for movement along said register, said device having a decimal indicating portion disposed in decimal indicating relationship with said register and a series of progressively distinguished indicia thereon denominationally spaced from each other and from said decimal indicating portion and sequentially corresponding with the successive indicia of the series indicating the denomination of said amount indicating means, and stop means carried by said frame and effective to prevent movement of said decimal indicating device relative to said frame during shifting movement of said carriage.

15. In a calculating machine having a frame carrying selection mechanism upon which a multiplicand may be set, including denominationally arranged means for indicating an amount entered thereinto; and a carriage carrying a product register and a multiplier register transversely shiftable relative to said frame; the combination of a decimal indicating device comprising a decimal indicator for one of said registers denominationally adjustable on said carriage, a decimal indicator for the other of said registers carried by said first mentioned decimal indicator and adjustable with respect thereto, and selectively settable means for preventing movement of said indicators relative to said frame during shifting of said carriage.

16. In a calculating machine having a pair of denominationally arranged registers, a decimal indicating device comprising decimal indicator means for one of said registers, decimal indicator means for the other of said registers, and selectively settable means for concurrently moving both of said indicator means along said registers in the same direction or, selectively, in opposite directions in timed relation with respect to each other.

17. In a calculating machine having a pair of denominationally arranged registers, a decimal indicating device comprising decimal indicator means for one of said registers, decimal indicator means for the other of said registers, means including selectively settable members for concurrently moving both of said indicator means along said registers in the same direction or, selectively, in opposite directions in timed relationship with respect to each other; said members being settable to release said indicators from said last named means to permit the decimal indicating position of one of said indicator means to be altered without altering the decimal indicating position of the other of said indicators.

18. In a calculating machine having a pair of denominationally arranged registers; a decimal indicating device comprising decimal indicator means for one of said registers, decimal indicator means for the other of said registers, a support for both of said indicator means adjustable along said registers, and means on said support interconnecting both of said indicator means for concurrent movement along said registers in opposite directions with respect to each other.

19. In a calculating machine having a pair of denominationally arranged registers; a decimal indicating device comprising decimal indicator means for one of said registers, decimal indicator means for the other of said registers, a support for both of said indicator means adjustable along said registers, means on said support interconnecting both of said indicator means for concurrent movement along said registers in opposite directions with respect to each other, and means for releasing one of said indicator means from said interconnecting means whereby the decimal indicating position of one of said decimal indicator means may be adjusted relative to said interconnecting means.

20. In a calculating machine having a frame, and a carriage carrying a pair of registers transversely shiftable relative to said frame; a decimal indicating device comprising a decimal indicator for one of said registers, a decimal indicator for the other of said registers, a driving device adapted to drive said indicators in either of opposite directions along said registers, means whereby each of said indicators may be selectively connected to said driving device to be driven in either of said opposite directions thereby, and means controlled by said carriage for operating said driving device.

EUGENE E. REYNOLDS.